US009704627B2

(12) United States Patent
Kato et al.

(10) Patent No.: US 9,704,627 B2
(45) Date of Patent: Jul. 11, 2017

(54) METAL POWDER CORE COMPRISING COPPER POWDER, COIL COMPONENT, AND FABRICATION METHOD FOR METAL POWDER CORE

(71) Applicant: HITACHI METALS, LTD., Tokyo (JP)

(72) Inventors: Tetsuro Kato, Tottori (JP); Shin Noguchi, Tottori (JP); Kazunori Nishimura, Tottori (JP)

(73) Assignee: HITACHI METALS, LTD., Tokyo (JP)

( * ) Notice: Subject to any disclaimer, the term of this patent is extended or adjusted under 35 U.S.C. 154(b) by 146 days.

(21) Appl. No.: 14/372,974

(22) PCT Filed: Jan. 15, 2013

(86) PCT No.: PCT/JP2013/050525
§ 371 (c)(1),
(2) Date: Jan. 6, 2015

(87) PCT Pub. No.: WO2013/108735
PCT Pub. Date: Jul. 25, 2013

(65) Prior Publication Data

US 2015/0162118 A1 Jun. 11, 2015

(30) Foreign Application Priority Data

Jan. 18, 2012 (JP) ................................ 2012-007880
Sep. 14, 2012 (JP) ................................ 2012-202619

(51) Int. Cl.
*C22C 33/02* (2006.01)
*B32B 5/16* (2006.01)
(Continued)

(52) U.S. Cl.
CPC ........ *H01F 1/15308* (2013.01); *B22F 1/0059* (2013.01); *B22F 1/02* (2013.01);
(Continued)

(58) Field of Classification Search
CPC ........ H01F 1/14; H01F 1/153; H01F 1/15391; H01F 1/20; H01F 1/28; C22C 33/0207
(Continued)

(56) References Cited

U.S. PATENT DOCUMENTS 4,257,830 A * 3/1981 Tsuya .................... B22D 11/06 148/112
4,881,989 A 11/1989 Yoshizawa et al.
(Continued)

FOREIGN PATENT DOCUMENTS

CN 1988065 A 6/2007
EP 0 342 296 A1 11/1989
(Continued)

OTHER PUBLICATIONS

Park et al., Development of magnetic materials and processing techniques applicable to integrated micromagnetic devices, J. Micromech. Microeng. 8 (1998) 307-316.*
(Continued)

*Primary Examiner* — Holly Le
(74) *Attorney, Agent, or Firm* — Birch, Stewart, Kolasch & Birch, LLP

(57) ABSTRACT

In a metal powder core constructed from soft magnetic material powder and a coil component employing this, a configuration suitable for reduction of a core loss is provided. The metal powder core constructed from soft magnetic material powder is characterized in that Cu is dispersed among the soft magnetic material powder. It is characterized in that, preferably, the soft magnetic material powder is pulverized powder of soft magnetic alloy ribbon and that Cu
(Continued)

is dispersed among the pulverized powder of soft magnetic alloy ribbon. Further, it is characterized in that, preferably, the soft magnetic alloy ribbon is a Fe-based nano crystal alloy ribbon or a Fe-based alloy ribbon showing a Fe-based nano crystalline structure and that the pulverized powder has a nano crystalline structure.

9 Claims, 3 Drawing Sheets

(51) Int. Cl.

| | |
|---|---|
| ***H01F 1/153*** | (2006.01) |
| ***H01F 1/28*** | (2006.01) |
| ***B22F 1/02*** | (2006.01) |
| ***C22C 45/02*** | (2006.01) |
| ***B22F 9/00*** | (2006.01) |
| ***B22F 9/04*** | (2006.01) |
| ***H01F 3/08*** | (2006.01) |
| ***H01F 41/02*** | (2006.01) |
| ***B22F 1/00*** | (2006.01) |
| ***B22F 3/02*** | (2006.01) |
| ***H01F 1/22*** | (2006.01) |
| ***H01F 1/24*** | (2006.01) |
| ***H01F 1/33*** | (2006.01) |
| ***H01F 27/255*** | (2006.01) |
| ***H01F 27/28*** | (2006.01) |

(52) U.S. Cl.

CPC ................ *B22F 3/02* (2013.01); *B22F 9/002* (2013.01); *B22F 9/04* (2013.01); *C22C 33/02* (2013.01); *C22C 33/0278* (2013.01); *C22C 45/02* (2013.01); *H01F 1/1535* (2013.01); *H01F 1/15333* (2013.01); *H01F 1/22* (2013.01); *H01F 1/24* (2013.01); *H01F 1/28* (2013.01); *H01F 1/33* (2013.01); *H01F 3/08* (2013.01); *H01F 27/255* (2013.01); *H01F 27/28* (2013.01); *H01F 41/0246* (2013.01)

(58) Field of Classification Search

USPC ................................ 428/402–406, 546, 570

See application file for complete search history.

(56) References Cited

U.S. PATENT DOCUMENTS

| | | | | |
|---|---|---|---|---|
| 4,985,089 | A | 1/1991 | Yoshizawa et al. | |
| 5,160,379 | A | 11/1992 | Yoshizawa et al. | |
| 5,486,404 | A * | 1/1996 | Nakajima | H01F 1/15341 428/143 |
| 6,284,060 | B1 * | 9/2001 | Matsutani | H01F 1/24 148/300 |
| 2004/0086412 | A1 | 5/2004 | Suzuki et al. | |
| 2004/0112173 | A1 * | 6/2004 | Maulik | C22C 33/0207 75/246 |
| 2007/0144615 | A1 | 6/2007 | Komuro et al. | |
| 2007/0175545 | A1 | 8/2007 | Urata et al. | |
| 2008/0078474 | A1 * | 4/2008 | Naito | C22C 33/0207 148/304 |
| 2010/0108196 | A1 * | 5/2010 | Ohta | C21D 8/1211 148/121 |
| 2011/0080248 | A1 * | 4/2011 | Nishimura | B22F 1/0003 336/221 |
| 2011/0285486 | A1 | 11/2011 | Maeda et al. | |

FOREIGN PATENT DOCUMENTS

| | | | |
|---|---|---|---|
| EP | 2 380 685 | A1 | 10/2011 |
| JP | 63-304603 | A | 12/1988 |
| JP | 64-28301 | A | 1/1989 |
| JP | 7-11396 | A | 1/1995 |
| JP | 2001-196216 | A | 7/2001 |
| JP | 2002-226902 | A | 8/2002 |
| JP | 2002-343618 | A | 11/2002 |
| JP | 2003-188009 | A | 7/2003 |
| JP | 2004-520486 | A | 7/2004 |
| JP | 2006-210847 | A | 8/2006 |
| JP | 2007-126696 | A | 5/2007 |
| JP | 2007-197903 | A | 8/2007 |
| JP | 2007-231415 | A | 9/2007 |
| JP | 2009-174034 | A | 8/2009 |
| JP | 2009-206337 | A | 9/2009 |
| JP | 2011-241455 | A | 12/2011 |
| WO | WO 2009/139368 | A1 | 11/2009 |
| WO | WO 2010/084812 | A1 | 7/2010 |

OTHER PUBLICATIONS

Extended European Search Report mailed Jun. 30, 2016 issued in the corresponding European Patent Application No. 13739102.5.

* cited by examiner

METAL POWDER CORE COMPRISING COPPER POWDER, COIL COMPONENT, AND FABRICATION METHOD FOR METAL POWDER CORE

CROSS-REFERENCE TO RELATED APPLICATIONS

This application is the National Phase of PCT International Application No. PCT/JP2013/050525, filed on Jan. 15, 2013, which claims priority under 35 U.S.C. 119(a) to Patent Application No. 2012-007880, filed in Japan on Jan. 18, 2012 and 2012-202619 filed in Japan on Sep. 14, 2012, all of which are hereby expressly incorporated by reference into the present application.

FIELD

The present invention relates to: a metal powder core employed in a PFC circuit adopted in an electrical household appliance such as a television and an air-conditioner, in a power supply circuit for photovoltaic power generation or of a hybrid vehicle or an electric vehicle, or in the like; a coil component employing this; and a fabrication method for metal powder core.

BACKGROUND

A first stage of a power supply circuit of an electrical household appliance is constructed from an AC/DC converter circuit converting an AC (alternating current) voltage to a DC (direct current) voltage. It is generally known that a phase deviation arises between the input current waveform and the voltage waveform in the inside of the converter circuit or that a phenomenon occurs that the current waveform itself does not become a sine wave. Thus, a so-called power factor decreases and hence a reactive power increases. Further, a harmonic noise is generated.

The PFC circuit is a circuit performing control such as to shape the waveform of such an AC input current into a phase and a waveform similar to those of the AC input voltage and thereby reduces the reactive power and the harmonic noise. In recent years, by the initiative of IEC (International Electro-technical Commission) which is a standardization organization, a circumstance arises that various devices are required by law to indispensably incorporate a power supply circuit of PFC control. In order that size reduction, height reduction, or the like may be achieved in a choke employed in the PFC circuit, the core employed in this is required to have a high saturation magnetic flux density, a low core loss, and an excellent direct-current superposing characteristic.

Further, in a power supply device mounted on an electric-motor driven vehicle such as a hybrid vehicle and an electric vehicle whose rapid spreading has begun in recent years, on a photovoltaic power generation apparatus, or on the like, a reactor tolerant of high currents is employed. Also in the core for such a reactor, a high saturation magnetic flux density and a low core loss are required similarly.

For the purpose of satisfying the above-mentioned requirement, a metal powder core is adopted that has a satisfactory balance between the high saturation magnetic flux density and the low core loss. The metal powder core is obtained by pressing after performing insulation treatment on the surface of magnetic powder of Fe—Si—Al family, Fe—Si family, or the like. Thus, electric resistance is improved by the insulation treatment so that eddy current loss is suppressed. As a technique relevant to this, in International Publication No. 2009/139368, for the purpose of further reduction in the core loss Pcv, a metal powder core is proposed whose main components are pulverized powder of Fe-based amorphous alloy ribbon serving as a first magnetic material and Fe-based amorphous alloy atomized powder with Cr serving as a second magnetic material.

SUMMARY

According to the configuration described in International Publication No. 2009/139368, a lower core loss Pcv is obtained in comparison with a metal powder core fabricated from magnetic metal powder of Fe—Si—Al family, Fe—Si family, or the like. However, a strong requirement is present for efficiency improvement in various power supply devices. Thus, further reduction in the core loss is necessary also in the metal powder core.

Thus, in view of the above-mentioned problem, an object of the present invention is to provide: a metal powder core having a configuration suitable for reduction of the core loss; a coil component employing this; and a fabrication method for metal powder core.

The metal powder core according to the present invention is characterized by a metal powder core constructed from soft magnetic material powder, wherein Cu is dispersed among the soft magnetic material powder.

When a configuration is adopted that Cu is dispersed among the soft magnetic material powder, the core loss is allowed to be reduced.

The metal powder core according to the present invention is characterized by a metal powder core constructed from soft magnetic material powder, wherein the soft magnetic material powder is pulverized powder of soft magnetic alloy ribbon, and wherein Cu is dispersed among the pulverized powder of soft magnetic alloy ribbon. When Cu is dispersed among the pulverized powder of soft magnetic alloy ribbon, the core loss is allowed to be remarkably reduced even by a smaller amount of Cu, in comparison with a case that Fe-based amorphous alloy atomized powder or the like intervenes.

Further, in the metal powder core, it is preferable that the soft magnetic alloy ribbon is a Fe-based amorphous alloy ribbon. The Fe-based amorphous alloy is a magnetic material having a high saturation magnetic flux density and a low loss and hence is suitable as a magnetic material for metal powder core. Further, in the metal powder core, it is more preferable that the content of the Cu is 0.1% to 7% relative to a total mass of the pulverized powder of soft magnetic alloy ribbon and the Cu. According to this configuration, in a state that reduction of the initial permeability is suppressed, reduction in the core loss is achievable. Further, according to the present invention, the hysteresis loss measured on the measurement conditions of a frequency of 20 kHz and an applied magnetic flux density of 150 mT is allowed to be made lower than or equal to 180 $kW/m^3$. Further, it is more preferable that the content of the Cu is 0.1% to 1.5%.

Further, in the metal powder core, it is also preferable that the soft magnetic alloy ribbon is a Fe-based nano crystal alloy ribbon or a Fe-based alloy ribbon showing a Fe-based nano crystalline structure. The Fe-based nano crystal alloy is a magnetic material having a remarkably low loss. Then, when the pulverized powder has a nano crystalline structure, the magnetic material is suitable for achieving loss reduction in the metal powder core. Further, in the metal powder core, it is more preferable that the content of the Cu is 0.1% to 10% relative to a total mass of the pulverized powder of soft magnetic alloy ribbon and the Cu. According to this configuration, in a state that reduction of the initial permeability is suppressed, reduction in the core loss is achievable. Further, according to the present invention, the hysteresis loss measured on the measurement conditions of a frequency of 20 kHz and an applied magnetic flux density of 150 mT is allowed to be made lower than or equal to 160 kW/m$^3$. Further, it is more preferable that the content of the Cu is 0.1% to 1.5%.

Further, in the metal powder core, it is preferable that a silicon oxide film is provided on the surface of a particle of the pulverized powder of soft magnetic alloy ribbon. This configuration enhances insulation of the pulverized powder and hence contributes to loss reduction.

The coil component according to the present invention is characterized by including: any one of the above-mentioned metal powder cores; and a coil wound around the metal powder core.

The fabrication method for metal powder core according to the present invention is characterized by a fabrication method for metal powder core constructed from soft magnetic material powder, wherein the soft magnetic material powder is pulverized powder of soft magnetic alloy ribbon, wherein the method includes: a first step of mixing pulverized powder of soft magnetic alloy ribbon and Cu powder with each other; and a second step of performing pressing of mixed powder obtained at the first step, and wherein a metal powder core is obtained in which Cu is dispersed among the pulverized powder of soft magnetic alloy ribbon. When Cu is dispersed among the pulverized powder of soft magnetic alloy ribbon, the core loss is allowed to be remarkably reduced even by a smaller amount of Cu.

Further, in the fabrication method for metal powder core, at the first step, it is preferable that the pulverized powder of soft magnetic alloy ribbon and the Cu powder are first mixed with each other and, after that, binder is added and then mixing is performed further.

Further, in the fabrication method for metal powder core, it is preferable that the Cu powder is granular.

Further, in the fabrication method for metal powder core, it is preferable that a silicon oxide film is provided on the surface of a particle of the pulverized powder of soft magnetic alloy ribbon to be provided prior to the first step.

Further, in the fabrication method for metal powder core, it is preferable that the soft magnetic alloy ribbon is a Fe-based amorphous alloy ribbon. The Fe-based amorphous alloy is a magnetic material having a high saturation magnetic flux density and a low loss and hence is suitable as a magnetic material for metal powder core. Further, in the fabrication method for metal powder core, it is more preferable that the content of the Cu powder is 0.1% to 7% relative to a total mass of the pulverized powder of soft magnetic alloy ribbon and the Cu powder.

Further, in the fabrication method for metal powder core, it is also preferable that the soft magnetic alloy ribbon is a Fe-based nano crystal alloy ribbon or a Fe-based alloy ribbon showing a Fe-based nano crystalline structure. The Fe-based nano crystal alloy is a magnetic material having a remarkably low loss. Then, when the pulverized powder has a nano crystalline structure, the magnetic material is suitable for achieving loss reduction in the metal powder core. Further, in this case, it is more preferable that the content of the Cu powder is 0.1% to 10% relative to a total mass of the pulverized powder of soft magnetic alloy ribbon and the Cu powder.

Further, in the fabrication method for metal powder core, it is preferable that the Fe-based alloy ribbon showing a Fe-based nano crystalline structure is applied and then crystallization treatment causing showing of a Fe-based nano crystalline structure is performed after the second step. According to this configuration, the crystallization treatment is allowed to serve also as heat treatment for strain release posterior to pressing. This simplifies the process.

According to the present invention, a metal powder core is allowed to be provided that employs a configuration that Cu is dispersed among soft magnetic material powder so that the core loss reduction is achievable. When the metal powder core of the present invention is employed, a coil component having a low loss is allowed to be provided.

The above and further objects and features will more fully be apparent from the following detailed description with accompanying drawings.

DETAILED DESCRIPTION

Embodiments of a metal powder core and a coil component according to the present invention are described below in detail. However, the present invention is not limited to these.

Figure 1:
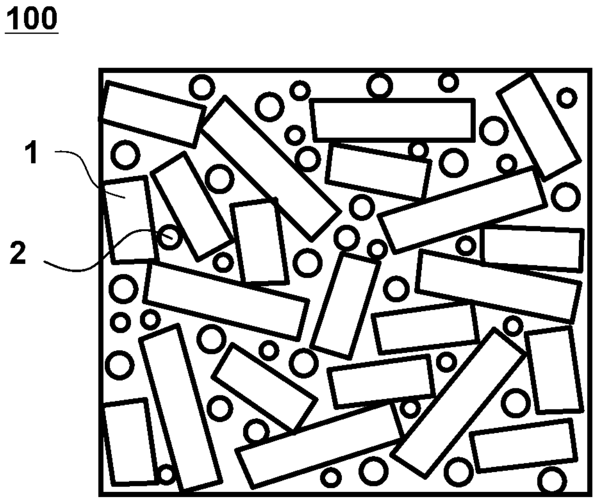
FIG. 1 is a schematic diagram of a metal powder core cross section, illustrating the concept of a metal powder core according to the present invention.

FIG. 1 is a schematic diagram illustrating the cross section of a metal powder core according to the present invention. The metal powder core 100 is constructed from soft magnetic material powder. In the embodiment illustrated in FIG. 1, pulverized powder 1 of soft magnetic alloy ribbon (simply referred to as pulverized powder, hereinafter) is employed as soft magnetic material powder.

Here, in the present invention, the soft magnetic material powder is not limited to a particular one.

However, pulverized powder of soft magnetic alloy ribbon has a cost advantage over atomized powder or the like. Further, in pulverized powder of amorphous alloy and nano crystal alloy obtained from soft magnetic alloy ribbon, a low loss is achievable.

In the metal powder core 100 in FIG. 1, Cu (metallic copper) 2 is dispersed among the pulverized powder 1 having a thin plate shape. This configuration is allowed to be obtained by compaction of mixed powder of pulverized powder and Cu powder. The mixed Cu powder intervenes among the pulverized powder 1 of soft magnetic alloy ribbon. Here, in the following description, the Cu intervening among the pulverized powder 1 of soft magnetic alloy ribbon in the inside of the metal powder core is also referred to as Cu powder in some cases, for convenience.

For example, the soft magnetic alloy ribbon applied to the present invention is an amorphous alloy ribbon or a nano crystal alloy ribbon of Fe base, Co base, or the like. Among these, a Fe-based amorphous alloy ribbon and a Fe-based nano crystal alloy ribbon are preferable that have a high saturation magnetic flux density. Details of such soft magnetic alloy ribbons are described later. The pulverized powder 1 of soft magnetic alloy ribbon has a plate shape. Thus, pulverized powder alone has unsatisfactory powder fluidity and hence density enhancement is difficult to be achieved in the metal powder core. Accordingly, a configuration is adopted that Cu powder smaller than the pulverized powder of soft magnetic alloy ribbon is mixed so that Cu 2 is dispersed among the pulverized powder 1 of soft magnetic alloy ribbon having a thin plate shape.

In general, Cu is softer than the soft magnetic alloy ribbon. Thus, at the time of compaction, Cu is easily deformed plastically and hence, in this point, contributes to improvement in the density. Further, an effect is also expectable that a stress to the pulverized powder is relaxed by the plastic deformation. Further, for the purpose of dispersing Cu among the soft magnetic material powder, a method of adding Cu powder during a fabrication process may be employed. At that time, the Cu powder is granular, typically, spherical. Thus, when the Cu powder is contained, at the time of pressing, the fluidity of the powder is improved and hence the density of the metal powder core is also improved.

In this point, a similar effect is expectable also in a soft magnetic material powder other than the pulverized powder of soft magnetic alloy ribbon.

Further, in the present invention, in addition to the pulverized powder of soft magnetic alloy ribbon, another magnetic powder (e.g., atomized powder) may be contained.

However, in order that the effect of Cu powder may be expressed to the maximum extent, it is more preferable that the magnetic powder is constructed from the pulverized powder of soft magnetic alloy ribbon alone.

Further, in the present invention, non-magnetic metal powder other than the Cu powder may be contained. However, in order that the effect of Cu powder may be expressed to the maximum extent, it is more preferable that the non-magnetic metal powder consists of the Cu powder alone.

Here, an important feature of the present invention is described below.

The present inventors have found a remarkable effect specifically attributed to the addition of Cu powder, which is different from that of the case that amorphous atomized powder is employed as spherical powder in a composite manner as in International Publication No. 2009/139368. This leads to the present invention. That is, the approach that Cu powder is added so that Cu is dispersed among the soft magnetic material powder has an especially remarkable effect not only in density enhancement but also in loss reduction.

Typically, Cu powder smaller than the principal surface of the pulverized powder of soft magnetic alloy ribbon is employed so that the Cu 2 is dispersed among the pulverized powder 1 having a thin plate shape. According to this configuration, the core loss is reduced in comparison with a case that the Cu powder is not contained, that is, Cu is not dispersed. The Cu even in an extremely very small amount expresses a remarkable effect of core loss reduction. Thus, the amount of usage is allowed to be suppressed to a small value. On the contrary, when the amount of usage is increased, a prominent effect of core loss reduction is achievable. Thus, the configuration that Cu powder is contained and then the Cu is dispersed among the pulverized powder is expected to be a configuration suitable for reduction of the core loss.

In the present invention, the expression that Cu is dispersed among the soft magnetic material powder indicates that Cu need not indispensably intervene in every gap among the soft magnetic material powder and hence it is sufficient that Cu intervenes at least in a part of the gaps among the soft magnetic material powder. Further, with increasing Cu dispersed, the core loss decreases more. Thus, from the perspective of core loss reduction, the content of Cu is not set forth. However, Cu itself is non-magnetic material. Thus, when the function as a magnetic core is taken into consideration, for example, 20% or lower is a practical range for the content of Cu (Cu powder) relative to the total mass of soft magnetic material powder and Cu (Cu powder). The Cu even in a very small amount expresses the effect of sufficient loss reduction. However, on the other hand, an excessive content of Cu causes reduction of the initial permeability.

In the present invention, when a Fe-based amorphous alloy ribbon is applied as a soft magnetic alloy ribbon, it is preferable that the content of Cu (Cu powder) is 0.1% to 7% relative to the total mass of pulverized powder and Cu (Cu powder). Further, similarly, in the case of a Fe-based nano crystal alloy ribbon or of a Fe-based alloy ribbon showing a Fe-based nano crystalline structure, it is preferable that the content of Cu (Cu powder) is 0.1% to 10% relative to the total mass of pulverized powder and Cu (Cu powder). According to this configuration, in a state that the effect of loss reduction is improved, reduction of the initial permeability is allowed to be suppressed within 5% in comparison with a case that Cu is not contained. Further, it is preferable that the content of Cu (Cu powder) is 0.1% to 1.5% relative to the total mass of pulverized powder and Cu (Cu powder). As long as the value falls within this range, the initial permeability has a tendency of increasing with increasing content of the Cu powder. Further, a remarkable effect of core loss reduction is expressed even when Cu is contained in a very small amount like this range. Thus, as long as the value falls within this range, the amount of usage of Cu is allowed to be suppressed to a small value and hence reduction of the cost is achievable.

In the present invention, Cu is dispersed among the pulverized powder of soft magnetic alloy ribbon having an especially flat shape so that a hysteresis loss among the core losses is mainly allowed to be reduced. In the conventional art, in a metal powder core employing pulverized powder of soft magnetic alloy ribbon having a flat shape, a high pressure has been necessary at the time of pressing. Thus, a stress generated at the time of pressuring had a large influence and hence the hysteresis loss caused by this has been difficult to be reduced. Further, for the purpose of reducing the eddy current loss, the soft magnetic alloy ribbon need have been made thin or alternatively the ratio of insulation coating need have been increased. This had caused difficulty in the fabrication or alternatively a sacrifice in other characteristics. In contrast, when Cu is dispersed so that the ratio of hysteresis loss is reduced, reduction of the core loss is achievable in a state that the above-mentioned difficulties or the like are avoided.

For example, the hysteresis loss measured on the measurement conditions of a frequency of 20 kHz and an applied magnetic flux density of 150 mT is allowed to be made lower than or equal to 180 $kW/m^3$ in the case of a Fe-based amorphous alloy ribbon and lower than or equal to 160 $kW/m^3$ in the case of a Fe-based nano crystal alloy ribbon, so that the overall core loss is allowed to be reduced. When the core loss is reduced, efficiency improvement and size reduction are achievable in a coil component or a device employing this. On the other hand, even when a large size metal powder core is required in high current applications, the amount of heat generation per unit volume is reduced and hence the amount of overall heat generation is allowed to be suppressed. That is, the metal powder core is easily allowed to be applied to high current and large type applications.

The morphology of dispersed Cu is not limited to a particular one. Further, the morphology of Cu powder employable as a raw material for the dispersed Cu is also not limited to a particular one. However, from the perspective of fluidity improvement at the time of pressurized formation, it is more preferable that the Cu powder is granular, especially, spherical. Such Cu powder is allowed to be obtained, for example, by an atomizing method. However, the method is not limited to this.

It is sufficient that the grain diameter of the Cu powder is such that the Cu powder is allowed to be dispersed among the pulverized powder of soft magnetic alloy ribbon having a thin plate shape. For example, in the case of pulverized powder alone, packing is hard to be achieved even by pressing. In contrast, when the spherical powder smaller than the thickness of the pulverized powder enters gaps among the pulverized powder, improvement in the packing density is accelerated further.

Granular powder like the Cu powder which is softer than the soft magnetic alloy improves the fluidity of the soft magnetic material powder and, at the same time, plastically deforms at the time of compaction so as to reduce gaps among the soft magnetic material powder. For example, for the purpose of more reliably reducing gaps among the pulverized powder of soft magnetic alloy ribbon, it is more preferable that the grain diameter of the Cu powder is 50% or smaller of the thickness of the pulverized powder of soft magnetic alloy ribbon such as the pulverized powder of Fe-based amorphous alloy ribbon. More specifically, when the thickness of the pulverized powder is 25 μm or smaller, it is preferable that the grain diameter of the Cu powder is 12.5 μm or smaller. When the thickness of ordinary amorphous alloy ribbon or nano crystal alloy ribbon is taken into consideration, Cu powder of 8 μm or smaller has high universality and hence is more preferable. When the grain diameter becomes excessively small, the cohesive force of the powder becomes large and hence dispersion becomes difficult. Thus, it is more preferable that the grain diameter of the Cu powder is 2 μm or larger. Here, from the perspective of the cost, Cu powder having a grain diameter of 6 μm or larger may be employed.

The grain diameter of the Cu powder employed as a raw material may be evaluated as the median diameter D50 (a particle diameter corresponding to the accumulated 50 volume %) measured by a laser diffraction/scattering method. The median diameter D50 of the Cu powder employed as a raw material agrees almost with the numerical value of grain diameter of the Cu powder in the metal powder core observed and measured with an SEM after the compaction. Here, the diameter of the Cu particle dispersed and plastically deformed among the pulverized powder becomes somewhat larger than the grain diameters of the Cu powder in the above-mentioned powder state. Grain diameter evaluation for the Cu powder dispersed in the metal powder core may be performed such that SEM observation is performed on the fracture surface of the metal powder core, then the average of the maximum diameter and the minimum diameter of an observed Cu particle is adopted as the grain diameter, and then the grain diameters of five or more Cu particles are averaged so that the obtained value is evaluated as the grain diameter of the Cu powder. It is preferable that the diameter of the Cu particle dispersed and plastically deformed among the pulverized powder falls within a range of 2 μm to 15 μm.

For example, the soft magnetic alloy ribbon is obtained by quenching molten metal like in a single-roll method. The alloy composition is not limited and may be selected in accordance with the necessary characteristics. In the case of an amorphous alloy ribbon, it is preferable to employ a Fe-based amorphous alloy ribbon having a high saturation magnetic flux density Bs of 1.4 T or higher. For example, a Fe-based amorphous alloy ribbon of Fe—Si—B family or the like represented by Metglas (registered trademark) 2605SA1 material may be employed.

On the other hand, in the case of a nano crystal alloy ribbon, it is preferable to employ a Fe-based nano crystal alloy ribbon having a high saturation magnetic flux density Bs of 1.2 T or higher. The employed nano crystal alloy ribbon may be a soft magnetic alloy ribbon known in the conventional art and having a microcrystalline structure whose grain diameter is 100 nm or smaller. Specifically, for example, a Fe-based nano crystal alloy ribbon of Fe—Si—B—Cu—Nb family, Fe—Cu—Si—B family, Fe—Cu—B family, Fe—Ni—Cu—Si—B family, or the like may be employed. Further, a family in which a part of these elements are replaced or a family in which other elements are added may be employed. As such, when a Fe-based nano crystal alloy is employed as a magnetic material, it is sufficient that the pulverized powder in the finally obtained metal powder core has a nano crystalline structure. Thus, at the time of being provided to pulverization, the soft magnetic alloy ribbon may be a Fe-based nano crystal alloy ribbon or alternatively a Fe-based alloy ribbon showing a Fe-based nano crystalline structure. The alloy ribbon showing a Fe-based nano crystalline structure indicates an alloy ribbon whose pulverized powder has a Fe-based nano crystalline structure in the finally obtained metal powder core having undergone crystallization treatment regardless of being in an amorphous alloy state at the time of pulverization. For example, a case that crystallization heat treatment is performed after pulverization or alternatively after pressing corresponds to this.

Here, in a nano crystal alloy of Fe—Si—B—Cu—Nb family represented by FINEMET (registered trademark) fabricated by Hitachi Metals, Ltd., the effect of density enhancement by Cu dispersion is recognizable. However, the coercive force and the magnetostriction constant are intrinsically small and hence the loss itself is extremely low. Thus, the effect of core loss reduction is hard to be recognized. Thus, when the configuration of Cu dispersion is applied to a nano crystal alloy ribbon like one of Fe—Cu—Si—B family having a magnetostriction constant of $5\times10^{-6}$ or higher and hence having a larger loss, the effect of core loss reduction by Cu dispersion is allowed to be recognized more clearly.

Specifically, for example, as a Fe-based amorphous alloy ribbon having a high saturation magnetic flux density, an alloy composition is preferable that is expressed by $Fe_aSi_bB_cC_d$ with $76\leq a<84$, $0<b\leq 12$, $8\leq c\leq 18$, and $d\leq 3$ in atom % and contains unavoidable impurities.

When the Fe amount a is lower than 76 atom %, a high saturation magnetic flux density Bs as a magnetic material becomes difficult to be obtained. Further, when the value is 84 atom % or higher, the thermal stability decreases so that stable fabrication of the amorphous alloy ribbon becomes difficult. For the purpose of a high Bs and stable fabrication, a value higher than or equal to 79 atom % and lower than or equal to 83 atom % is more preferable.

Si is an element contributing to the amorphous phase formation capability. In order that the Bs may be improved, the Si amount b need to be 12 atom % or lower. Further, a value of 5 atom % or lower is more preferable.

B is an element most strongly contributing to the amorphous phase formation capability. When the B amount c is lower than 8 atom %, the thermal stability decreases. When the value exceeds 18 atom %, the amorphous phase formation capability is saturated. For the purpose of coexistence of a high Bs and the amorphous phase formation capability, it is more preferable that the B amount is higher than or equal to 10 atom % and lower than or equal to 17 atom %.

C is an element having an effect of improving a squareness property of the magnetic material and improving the Bs, but not indispensable. When the C amount d is higher than 3 atom %, embrittlement appears significantly and the thermal stability decreases.

Here, for the Fe amount a, when 10 atom % or lower is replaced by Co, the Bs is allowed to be improved. Further, at least one or more kinds of elements selected from Cr, Mo, Zr, Hf, and Nb may be contained at 0.01 to 5 atom %. Furthermore, as unavoidable impurities, at least one or more kinds of elements selected from S, P, Sn, Cu, Al, and Ti may be contained at 0.5 atom % or lower.

Figure 2:
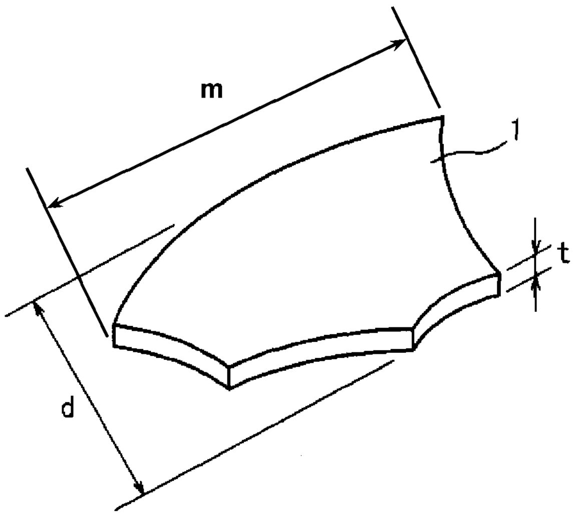
FIG. 2 is a schematic diagram describing the shape and the dimensions of Fe-based amorphous alloy ribbon pulverized powder.

The morphology of the pulverized powder of soft magnetic alloy ribbon such as a Fe-based amorphous alloy ribbon is illustrated in FIG. 2. In general, the soft magnetic alloy ribbon has a smaller thickness of a few tens μm or the like. Thus, a particle whose principal surfaces have a high aspect ratio is easily broken such that the aspect ratio may be reduced. Thus, although the principal surfaces (a pair of faces perpendicular to the thickness direction) of each particle are irregular, the difference between the minimum d and the maximum m in the in-plane directions of the principal surfaces is reduced and hence bar-shaped pulverized powder is hard to be generated. It is preferable that the thickness t of the soft magnetic alloy ribbon falls within a range of 10 to 50 μm. When the thickness is smaller than 10 μm, the mechanical strength of the alloy ribbon itself is low and hence stable casting of a long alloy ribbon becomes difficult. Further, when the thickness exceeds 50 μm, a part of the alloys is easily crystallized. Then, in this case, the characteristics are degraded. It is more preferable that the thickness is 13 to 30 μm.

Further, when the grain diameter of the pulverized powder of soft magnetic alloy ribbon is made smaller, the processing strain introduced by the pulverization becomes larger. This causes an increase in the core loss. On the other hand, when the grain diameter is large, the fluidity decreases so that density enhancement becomes difficult to be achieved. Thus, it is preferable that the grain diameter of the pulverized powder of soft magnetic alloy ribbon in a direction (the in-plane directions of the principal surfaces) perpendicular to the thickness direction is larger than 2 times of the thickness of the alloy ribbon and smaller than or equal to 6 times. Here, the grain diameter of the pulverized powder in the metal powder core is evaluated by polishing a cross section (a cross section viewed from a direction perpendicular to the pressurization direction of the metal powder core) where cross sections of the ribbons in the thickness direction are predominantly exposed and then observing it using a scanning electron microscope (referred to as an SEM, hereinafter) or the like. Specifically, a photograph of the polished cross section is taken. Then, the dimensions in the longitudinal direction of flat pulverized powder present within a view field of 0.2 $mm^2$ are averaged and adopted as the grain diameter of the pulverized powder. In the pulverized powder of soft magnetic alloy ribbon, in SEM observation, the morphology of pulverization processing is hardly recognized in the two parallel principal surfaces perpendicular to the thickness direction. That is, edges in the end parts of the principal surfaces are recognized clearly.

In the metal powder core, when means of insulation in the pulverized powder of soft magnetic alloy ribbon is taken, the eddy current loss is allowed to be suppressed so that a low core loss is allowed to be realized. Thus, it is preferable to provide a thin insulation coating on the surface of a particle of the pulverized powder. The pulverized powder itself may be oxidized so that an oxide film may be formed on the surface. However, it is not always easy to form, by this method, an oxide film having high uniformity and reliability in a state that damage to the pulverized powder is suppressed. Thus, it is preferable to provide a coating composed of an oxide other than the oxide of an alloy content of the pulverized powder.

In this point, a configuration is preferable that a silicon oxide film is provided on the surface of a particle of the pulverized powder of soft magnetic alloy ribbon. The silicon oxide is excellent in insulation. Further, a homogeneous film is easily formed by a method described later. For the purpose of reliable insulation, it is preferable that the thickness of the silicon oxide film is 50 nm or greater. On the other hand, when the silicon oxide film becomes excessively thick, the space factor of the metal powder core decreases and hence the particle-to-particle distance in the pulverized powder of soft magnetic alloy ribbon increases so that the initial permeability decreases. Thus, it is preferable that the film is of 500 nm or less.

Next, a fabrication process for a metal powder core in which Cu is dispersed is described below. The fabrication method of the present invention is a fabrication method for metal powder core constructed from soft magnetic material powder, wherein the soft magnetic material powder is pulverized powder of soft magnetic alloy ribbon, and wherein the method includes: a first process of mixing pulverized powder of soft magnetic alloy ribbon and Cu powder with each other; and a second process of performing pressing of mixed powder obtained by the first process. As a result of the first and the second processes, a metal powder core is obtained in which Cu is dispersed among the pulverized powder of soft magnetic alloy ribbon. As for the part other than the first and the second processes, a configuration according to a fabrication method for metal powder core known in the conventional art may suitably be applied when necessary.

First, description is given for an example of a fabrication method of pulverized powder of soft magnetic alloy ribbon to be provided to the first process. In pulverization of a soft magnetic alloy ribbon, the pulverization property is improved when embrittlement treatment is performed in advance. For example, a Fe-based amorphous alloy ribbon has a property that embrittlement is caused by heat treatment at 300° C. or higher so that pulverization becomes easy. When the temperature of this heat treatment is increased, embrittlement occurs more strongly so that pulverization becomes easy. However, when the temperature exceeds 380° C., the core loss Pcv increases. A preferable embrittlement heat treatment temperature is higher than or equal to 320° C. and lower than 380° C. The embrittlement treatment may be performed in a spooled state that the ribbon is wound in. Alternatively, the embrittlement treatment may be performed in a shaped lump state achieved when the ribbon not wound is pressed into a given shape. However, this embrittlement treatment is not indispensable. For example, in the case of a nano crystal alloy ribbon or an alloy ribbon showing a nano crystalline structure which are intrinsically brittle, the embrittlement treatment may be omitted.

Here, the pulverized powder is allowed to be obtained by one step of pulverization. However, in order to obtain a desired grain diameter, from the perspective of pulverization ability and of uniformity in the grain diameter, it is preferable that the pulverization process is divided into at least two steps and performed in the form of coarse pulverization and fine pulverization posterior to this so that the grain diameter is reduced stepwise. It is more preferable that the pulverization is performed in three steps consisting of coarse pulverization, medium pulverization, and fine pulverization.

For the purpose of homogenizing the grain diameter, it is preferable that classification is performed on the pulverized powder having undergone the last pulverization process. The method of classification is not limited to a particular one. However, a method employing a sieve is simple and preferable.

Such a method employing sieves is described below. Two kinds of sieves having mutually different apertures are employed. Then, pulverized powder having passed through the sieve having the larger aperture and not having passed through the sieve having the smaller aperture is adopted as raw material powder for the metal powder core. In this case, the minimum diameter d of each particle of the pulverized powder posterior to the classification becomes smaller than or equal to a numerical value (the diagonal dimension of the aperture; referred to as the upper limit, hereinafter) obtained by multiplying by 1.4 the aperture dimension of the sieve having the larger aperture.

Further, when it is premised that the classification has been achieved with precision, the minimum diameter is allowed to be regarded as larger than a numerical value (the diagonal dimension of the aperture; referred to as the lower limit, hereinafter) obtained by multiplying by 1.4 the aperture dimension of the sieve having the smaller aperture. Thus, in the pulverized powder having undergone the above-mentioned classification, the minimum diameter d of each particle falls within a range between the upper limit and the lower limit calculated from the apertures of the sieves. Further, this range approximately agrees with a range of the minimum diameters in the plane directions of the principal surfaces observed and measured with an SEM.

The grain diameter of the pulverized powder having undergone the classification and not yet having undergone the pressing is allowed to be controlled by using the lower limit and the upper limit of the minimum diameter d. As described above, a smaller grain diameter in the particle indicates that a larger processing strain has been introduced by the pulverization.

From the perspective of ensuring the fluidity or the like, the powder may be used after coarse particles alone are removed. However, as described above, it is more preferable that fine particles also are removed. From the perspective of a low core loss, it is preferable that the lower limit of the minimum diameter d is set to exceed twice the thickness of the soft magnetic alloy ribbon. Further, when the upper limit of the minimum diameter d is set to be 6 times or smaller of the thickness of the soft magnetic alloy ribbon, fluidity at the time of pressing is ensured so that the pressing density is allowed to be increased.

When the upper limit and the lower limit of the above-mentioned minimum diameter d are controlled, the above-mentioned preferable range of the grain diameter of the pulverized powder in the metal powder core is allowed to be realized.

Next, for the purpose of reducing the loss, it is preferable that an insulation coating is provided in the pulverized powder having undergone the pulverization process. A formation method for this is described below. For example, in a case that a soft magnetic alloyed powder of Fe base is employed, when heat treatment at 100° C. or higher is performed in humid atmosphere, the Fe on the surface of a particle of the soft magnetic alloyed powder is oxidized or hydroxylated so that an insulation coating of iron oxide or iron hydroxide is allowed to be formed.

Further, when the soft magnetic alloyed powder is immersed and agitated in a mixed solution of TEOS (tetraethoxysilane), ethanol, and aqueous ammonia, and then dried, a silicon oxide film is allowed to be formed on the surface of a particle of the pulverized powder. According to this method, a chemical reaction such as oxidization of the surface of a particle of the soft magnetic alloyed powder itself is not necessary. Further, silicon and oxygen are linked together so that a silicon oxide film is formed in a planar and network shape on the surface of a particle of the soft magnetic alloyed powder. Thus, an insulation coating having a uniform thickness is allowed to be formed on the surface of a particle of the soft magnetic alloyed powder.

Next, the first process of mixing the pulverized powder of soft magnetic alloy ribbon and the Cu powder is described below. The mixing method for the pulverized powder of soft magnetic alloy ribbon and the Cu powder is not limited to a particular one. Then, for example, a dry type agitation mixer may be employed. Further, by the first process, the following organic binder or the like is mixed. The pulverized powder of soft magnetic alloy ribbon, the Cu powder, the organic binder, and the like are allowed to be mixed simultaneously. However, from the perspective of mixing uniformly and efficiently the pulverized powder of soft magnetic alloy ribbon and the Cu powder, it is preferable that by the first process, the pulverized powder of soft magnetic alloy ribbon and the Cu powder are first mixed with each other and, after that, the binder is added and then mixing is performed further. By virtue of this, uniform mixing is achievable in a shorter time and hence shortening of the mixing time is achievable.

At the time of pressing of the mixed powder of the pulverized powder and the Cu powder, an organic binder may be employed for the purpose of binding together the powder at a room temperature. On the other hand, application of post-pressing heat treatment described later is effective for the purpose of removing the processing strain by pulverization or pressing. When this heat treatment is applied, the organic binder almost disappears by thermal decomposition. Thus, in the case of the organic binder alone, the binding force in the powder of the pulverized powder and the Cu powder is lost after the heat treatment so that the compact strength is no longer allowed to be maintained in some cases. Thus, in order that the powder may be bounded together even after the heat treatment, it is effective to add a high-temperature binder together with the organic binder. It is preferable that the high-temperature binder represented by an inorganic binder is a binder that, in a temperature range where the organic binder suffers thermal decomposition, begins to express fluidity and thereby wets and spreads over the powder surface so as to bind together the powder. When the high-temperature binder is applied, the binding force is allowed to be maintained even after being cooled to a room temperature.

It is preferable that the organic binder is a binder that maintains the binding force in the powder such that a chip or a crack may not occur in the compact in the handling prior to the pressing process and the heat treatment, and that easily suffers thermal decomposition by the heat treatment posterior to the pressing. An acryl family resin or a polyvinyl alcohol is preferable as a binder whose thermal decomposition is almost completed by the post-pressing heat treatment.

As the high-temperature binder, a low melting glass in which fluidity is obtained at relatively low temperatures and a silicone resin which is excellent in heat resistance and insulation are preferable. As the silicone resin, a methyl silicone resin and a phenylmethyl silicone resin are more preferable. The amount to be added is determined in accordance with: the fluidity of the high-temperature binder and the wettability and the adhesive strength relative to the powder surface; the surface area of the metal powder and the mechanical strength required in the core after the heat treatment; and the required core loss Pcv. When the added amount of the high-temperature binder is increased, the mechanical strength of the core increases. However, at the same time, the stress to the soft magnetic alloyed powder also increases. Thus, the core loss Pcv also increases. Accordingly, a low core loss Pcv and a high mechanical strength are in a relation of trade-off. The added amount is optimized in accordance with the required core loss Pcv and mechanical strength.

Further, for the purpose of reducing the friction between the powder and the metal mold at the time of pressing, it is preferable that stearic acid or stearate such as zinc stearate is added by 0.5 to 2.0 mass % relative to the total mass of the pulverized powder of soft magnetic alloy ribbon, the Cu powder, the organic binder, and the high-temperature binder. In the state that the organic binder is mixed, the mixed powder is in a state of agglomerate powder having a wide grain size distribution owing to the binding function of the organic binder. When the powder is caused to pass through a sieve such as a vibration sieve, granulated powder is obtained.

The mixed powder obtained by the first process is granulated as described above and then provided to the second process of performing pressing. The granulated mixed powder is formed into a given shape such as a toroidal shape and a rectangular parallelepiped shape by pressing by using a forming mold. Typically, the pressing is achievable at a pressure higher than or equal to 1 GPa and lower than or equal to 3 GPa with a holding time of several seconds or the like. The pressure and the holding time are optimized in accordance with the content of the organic binder and the required compact strength. In the metal powder core, from the perspective of the strength and the characteristics, compaction to $5.3\times10^3$ kg/$m^3$ or higher is preferable in practice.

In order to obtain a satisfactory magnetic property, it is preferable that the stress strain caused by the above-mentioned pulverization process and the second process of pressing is relaxed. In the case of a Fe-based amorphous alloy ribbon, when heat treatment is performed within in a temperature range higher than or equal to 350° C. and lower than or equal to the crystallization temperature (typically lower than or equal to 420° C.), the effect of relaxation of stress strain is large and hence a low core loss Pcv is allowed to be obtained. At a temperature lower than 350° C., stress relaxation is insufficient. Further, when the temperature exceeds the crystallization temperature, a part of the pulverized powder of soft magnetic alloy ribbon deposit as bulk crystal grains so that the core loss Pcv increases remarkably. Further, for the purpose of stably obtaining a low core loss Pcv, a temperature higher than or equal to 380° C. and lower than or equal to 410° C. is more preferable. The holding time is set up suitably in accordance with the size of the metal powder core, the throughput, the allowable range for characteristics variations, and the like. Then, a value of 0.5 to 3 hours is preferable.

Here, the crystallization temperature is described below. The crystallization temperature is allowed to be determined by measuring the exothermic behavior with a differential scanning calorimeter (DSC). In an embodiment described later, Metglas (registered trademark) 2605SA1 fabricated by Hitachi Metals, Ltd. is employed as a Fe-based amorphous alloy ribbon. The crystallization temperature in an alloy ribbon state is 510° C. and higher than the crystallization temperature 420° C. in a pulverized powder state. The reason for this is expected that in the pulverized powder, owing to the stress at the time of pulverization, crystallization begins at a temperature lower than the intrinsic crystallization temperature of the alloy ribbon.

On the other hand, in a case that the soft magnetic alloy ribbon is a nano crystal alloy ribbon or an alloy ribbon showing a Fe-based nano crystalline structure, crystallization treatment is performed at any stage of the process so that a nano crystalline structure is imparted to the pulverized powder. That is, the crystallization treatment may be performed before pulverization and the crystallization treatment may be performed after pulverization. Here, the scope of the crystallization treatment includes also heat treatment for crystallization acceleration of improving the ratio of the nano crystalline structure. The crystallization treatment may serve also as heat treatment for strain relaxation posterior to the pressing, or alternatively may be performed as a process separate from the heat treatment for strain relaxation. However, from the perspective of simplification of the fabrication process, it is preferable that the crystallization treatment serves also as heat treatment for strain relaxation posterior to the pressing. For example, in the case of an alloy ribbon showing a Fe-based nano crystalline structure, it is sufficient that the heat treatment posterior to the pressing which serves also as crystallization treatment is performed within a range of 390° C. to 480° C.

The coil component of the present invention includes: a metal powder core obtained as described above; and a coil wound around the metal powder core. The coil may be constructed by winding a lead wire around the metal powder core or alternatively by winding a lead wire around a bobbin. For example, the coil component is a choke, an inductor, a reactor, a transformer, or the like. For example, the coil component is employed in a PFC circuit adopted in an electrical household appliance such as a television and an air-conditioner, in a power supply circuit for photovoltaic power generation or of a hybrid vehicle or an electric vehicle, or in the like, so as to contribute to loss reduction and efficiency improvement in these devices and apparatuses.

Embodiments

Embodiment Employing Amorphous Alloy Ribbon (Fabrication of Amorphous Alloy Ribbon Pulverized Powder)

As a Fe-based amorphous alloy ribbon, Metglas (registered trademark) 2605SA1 material having an average thickness of 25 μm fabricated by Hitachi Metals, Ltd. was employed. The 2605SA1 material is a Fe—Si—B family material. This Fe-based amorphous alloy ribbon was wound around an air core into 10 kg. The Fe-based amorphous alloy ribbon was heated at 360° C. for 2 hours in an oven of dry air atmosphere so that embrittlement was performed. After the wound body taken out of the oven was cooled down, coarse pulverization, medium pulverization, and fine pulverization were performed successively with mutually different pulverizers. The obtained alloy ribbon pulverized powder was caused to pass through a sieve of aperture 106 μm (diagonal 150 μm). At that time, approximately 80 mass % passed through the sieve. Further, alloy ribbon pulverized powder having passed through a sieve of aperture 35 μm (diagonal 49 μm) was removed. The alloy ribbon pulverized powder having passed through the sieve of aperture 106 μm and not having passed through the sieve of aperture 35 μm was observed with an SEM. In the powder having passed through the sieve, the two principal surfaces of the metal ribbon had irregular shapes as illustrated in FIG. 2. The range of the minimum diameter was 50 μm to 150 μm. Further, the morphology of pulverized processing was hardly recognized in the two principal surfaces. That is, edges in the end parts of the two principal surfaces were recognized clearly.

(Silicon Oxide Film Formation onto Amorphous Alloy Ribbon Pulverized Powder Surface)

5 kg of the amorphous alloy ribbon pulverized powder, 200 g of TEOS (tetraethoxysilane, $Si(OC_2H_5)_4$), 200 g of aqueous ammonia solution (ammonia content of 28 to 30 volume %), 800 g of ethanol were mixed together and then agitated for 3 hours. Next, the alloy ribbon pulverized powder was separated by filtration and then dried in an oven at 100° C. After the drying, when the cross section of the pulverized powder of the amorphous alloy ribbon was observed with an SEM, a silicon oxide film was formed on the surface of a particle of the pulverized powder and the thickness was 80 to 150 nm.

(First Process (Mixing of Pulverized Powder and Cu Powder))

As Cu powder, spherical powder having an average grain diameter of 4.8 μm was employed. A total of 5 kg of pulverized powder and Cu powder having been weighed such as to satisfy the mass ratio of the pulverized powder of amorphous alloy ribbon and the Cu powder as listed in Table 1, 60 g of phenylmethyl silicone (SILRES 1144 fabricated by Wacker Asahikasei Silicone Co., Ltd.) serving as a high-temperature binder, and 100 g of acrylic resin (Polysol AP-604 fabricated by Showa Highpolymer Co., Ltd.) serving as an organic binder were mixed together and then dried at 120° C. for 10 hours so that mixed powder was obtained.

Here, for comparison, in place of the Cu powder, other powders were also investigated that had similarly an average grain diameter of approximately 5 μm. As comparison examples of this case, prepared were: mixed powder (No. 12) that employed, instead of the Cu powder, Fe-based amorphous alloy atomized spherical powder (composition formula: $Fe_{74}B_{11}Si_{11}C_2Cr_2$) having an average grain diameter of 5 μm and then was fabricated similarly to the example of the present invention in the other points; and mixed powder (No. 13) that employed, instead of the Cu powder, Al powder having an average grain diameter of 5 μm and then was fabricated similarly to the example of the present invention in the other points.

(Second Process (Pressing) and Heat Treatment)

Each mixed powder obtained by the first process was caused to pass through a sieve of aperture 425 μm so that granulated powder was obtained. When passing through the sieve of aperture 425 μm, granulated powder having a grain diameter smaller than or equal to approximately 600 μm is obtained. 40 g of zinc stearate was mixed to this granulated powder and then pressing was performed at a pressure of 2 GPa with a holding time of 2 seconds by using a pressing machine such that a toroidal shape having an outer diameter of 14 mm, an inner diameter of 8 mm, and a height of 6 mm may be obtained. The obtained compact was processed by heat treatment at 400° C. for 1 hour in air atmosphere in an oven.

(Measurement of Magnetic Property)

In the toroid-shaped metal powder core fabricated by the above-mentioned process, winding of 29 turns was provided as each of the primary and the secondary windings using an insulation-coated lead wire having a diameter of 0.25 mm. The core loss Pcv was measured on the conditions of a maximum magnetic flux density of 150 mT and a frequency of 20 kHz by using a B-H Analyzer SY-8232 fabricated by Iwatsu Test Instruments Corporation.

Further, measurement of the initial permeability μi was performed on the toroid-shaped metal powder core provided with winding of 30 turns of an insulation-coated lead wire having a diameter of 0.5 mm, at a frequency of 100 kHz by using 4284A fabricated by Hewlett-Packard Company. The results are listed in Table 1.

Further, for a part of the metal powder cores, in addition to the core loss measurement described above, the frequency dependence of the core loss was measured with changing the frequency f between 10 kHz and 100 kHz. Then, the part a×f proportional to the frequency f was adopted as the hysteresis loss Phv, then the part $b\times f^2$ proportional to the square $f^2$ of the frequency f was adopted as the eddy current loss Pev, and then the hysteresis loss and the eddy current loss were evaluated separately. On the basis such evaluation, the hysteresis loss Phv over the total of the eddy current loss Pev and the hysteresis loss Phv measured on the measurement conditions of a frequency of 20 kHz and an applied magnetic flux density of 150 mT was calculated. The results are listed in Table 2 together with the density of the metal powder core.

TABLE 1

| No | Pulverized powder content percentage (mass %) | Cu powder content percentage (mass %) | Core loss Pcv (kW/m$^3$) | Initial permeability μi | Remark |
|---|---|---|---|---|---|
| 1 | 100.0 | 0.0 | 261 | 45 | Comparison example |
| 2 | 99.9 | 0.1 | 215 | 45 | Example of present invention |
| 3 | 99.7 | 0.3 | 205 | 45 | |
| 4 | 99.5 | 0.5 | 206 | 45 | |
| 5 | 99.0 | 1.0 | 206 | 45 | |
| 6 | 98.0 | 2.0 | 189 | 45 | |
| 7 | 97.0 | 3.0 | 164 | 45 | |
| 8 | 95.0 | 5.0 | 165 | 44 | |
| 9 | 93.0 | 7.0 | 141 | 43 | |
| 10 | 91.0 | 9.0 | 139 | 38 | |
| 11 | 90.0 | 10.0 | 137 | 36 | |
| 12 | 97.0 | 3.0(*) | 236 | 49 | Comparison example |
| 13 | 98.0 | 2.0(**) | 254 | 43 | |

(*)Fe-based amorphous alloy atomized powder was employed in place of Cu powder.
(**)Al powder was employed in place of Cu powder.

TABLE 2

| No | Pulverized powder content percentage (mass %) | Cu powder content percentage (mass %) | Density × $10^3$ (kg/$m^3$) | Phv (kW/$m^3$) | Pev (kW/$m^3$) | Remark |
|---|---|---|---|---|---|---|
| 1 | 100.0 | 0.0 | 5.40 | 234 | 33 | Comparison example |
| 2 | 99.9 | 0.1 | 5.42 | 176 | 36 | Example of present invention |
| 4 | 99.5 | 0.5 | 5.43 | 174 | 31 | |
| 5 | 99.0 | 1.0 | 5.45 | 176 | 28 | |
| 6 | 98.0 | 2.0 | 5.47 | 158 | 29 | |
| 7 | 97.0 | 3.0 | 5.50 | 127 | 29 | |
| 9 | 93.0 | 7.0 | 5.60 | 116 | 32 | |
| 11 | 90.0 | 10.0 | 5.62 | 109 | 32 | |
| 12 | 97.0 | 3.0(*) | 5.47 | 203 | 37 | Comparison example |
| 13 | 98.0 | 2.0(**) | 5.28 | 230 | 29 | |

(*)Fe-based amorphous alloy atomized powder was employed in place of Cu powder
(**)Al powder was employed in place of Cu powder The sample No. 1 in Table 1 is a metal powder core of a comparison example not containing Cu powder and had a large core loss Pcv of 261 kW/$m^3$. The sample No. 2 is a metal powder core of an example of the present invention containing 0.1 mass % of Cu (Cu powder) and had a core loss Pcv of 215 kW/$m^3$ so that the loss was reduced by approximately 18% in comparison with a case that Cu was not added. Further, as for the initial permeability μi, these metal powder cores were equivalent to each other. That is, it is understood that when Cu powder is contained even in an extremely very small amount, the core loss decreases dramatically in a state that the initial permeability is maintained.

Nos. 2 to 11 in Table 1 list the core loss Pcv and the like of the metal powder core in a case that the content of Cu powder was increased from 0.1 mass % to 10.0 mass % in the example of the present invention. It is understood that in all of the metal powder cores Nos. 2 to 11 in Table 1 containing Cu powder, the core loss is decreased by 15% or more in comparison with the metal powder core No. 1 not containing Cu powder and that with increasing Cu powder, the core loss Pcv is allowed to be reduced. Further, it is understood that with increasing content of Cu powder, the density of the metal powder core is also improved so that compaction to 5.42×$10^3$ kg/$m^3$ or higher is achieved (Table 2).

On the other hand, the initial permeability hardly varied when the content of Cu powder fell within a range of 0.1 mass % to 7.0 mass % (Nos. 2 to 9) so that a value of 43 or higher was maintained. The reason why, despite that Cu is a non-magnetic material, reduction of the initial permeability is suppressed even when the content increases is expected to be attributed to the effect of the above-mentioned improvement in the density of the metal powder core caused by the containing of Cu.

Further, in No. 10 and No. 11 where the content of Cu exceeds 7.0 mass %, although the effect of reduction of the core loss Pcv was obtained, the initial permeability was reduced respectively by 16% and 20% in comparison with the case (No. 1) that Cu powder is not contained. From this fact, it is understood that when the content of Cu powder is set to fall within a range of 7.0 mass % or lower, reduction of the initial permeability is allowed to be suppressed within 5% in comparison with a case that Cu powder is not contained. Further, when the content of Cu powder was 3% or lower, core loss reduction was achievable without a substantial decrease in the initial permeability.

Further, when the content of Cu powder was 2% or higher (Nos. 6 to 11), a remarkably low core loss of 200 kW/$m^3$ or lower was obtained. When the metal powder core having a core loss Pcv of 215 kW/$m^3$ or lower at a frequency of 20 kHz and at a magnetic flux density of 150 mT and having an initial permeability μi of 43 or higher at a frequency of 100 kHz listed in Table 1 is employed, this contributes to efficiency improvement and size reduction in a coil component or a device employing this. In this perspective, it is more preferable to employ a metal powder core whose core loss described above is 200 kW/$m^3$ or lower.

As clearly seen from Table 2, the eddy current loss Pev has stayed within 28 to 36 kW/$m^3$ and has not largely varied regardless of the content of Cu powder. Thus, it is understood that the effect of core loss reduction by the containing of Cu powder is mainly achieved by reduction in the hysteresis loss. When the hysteresis loss Phv is made lower than or equal to 180 kW/$m^3$, an overall core loss of 220 kW/$m^3$ or lower is achievable. It is understood that when the hysteresis loss Phv decreases, the ratio of the hysteresis loss Phv to the total of the eddy current loss Pev and the hysteresis loss Phv measured on the measurement conditions of a frequency of 20 kHz and an applied magnetic flux density of 150 mT is allowed to be reduced to 84.0% or lower or, further, 80.0% or lower.

On the other hand, No. 12 is a metal powder core of a comparison example containing 3.0 mass % of Fe-based amorphous alloy atomized spherical powder in place of Cu powder. The core loss Pcv thereof was 236 kW/$m^3$. Then, a remarkable effect of core loss reduction was not seen in comparison with No. 1 constructed from the pulverized powder of amorphous alloy ribbon alone. Further, the core loss thereof has increased by approximately 44% in comparison with the core loss 164 kW/$m^3$ of the metal powder core (No. 7) containing Cu powder of the same mass (3.0 mass %), and by as large as approximately 10% even in comparison with the core loss 215 kW/$m^3$ of the metal powder core (No. 2) containing Cu powder in an extremely very small amount of 0.1 mass %. That is, it is understood that the configuration employing Cu powder requires only a small amount of powder usage and hence is remarkably advantageous also in the cost perspective.

Further, the core loss of the metal powder core (No. 13) containing, in place of Cu powder, 2.0 mass % of Al powder recognized as easily suffering plastic deformation similarly to Cu powder was 254 kW/$m^3$ and hence had no significant difference from No. 1 constructed from the pulverized powder of amorphous alloy ribbon alone. Thus, it has become clear that containing of Cu powder provides a remarkable effect not obtained by containing of another powder.

Further, metal powder cores were fabricated that employed Cu powders having average grain diameters of 2.5 μm and 8 μm, respectively and that employed conditions similarly to those of No. 7 in other points. Then, the core losses were 177 kW/$m^3$ and 182 kW/$m^3$, respectively. As such, a remarkable effect of core loss reduction similarly to No. 7 and the like has been recognized.

Figure 3:
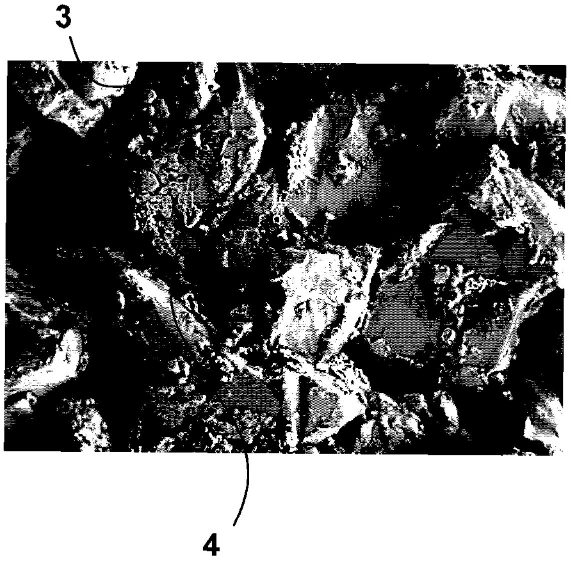
FIG. 3 is an SEM observation photograph of a fracture surface of a metal powder core described in an embodiment.

An SEM photograph of a fracture surface of the metal powder core No. 7 is illustrated in FIG. 3. Simultaneously to the SEM observation, element mapping by EDX also was performed so that identification of Cu (Cu powder) was also performed. On the principal surface of the flat-plate shaped pulverized powder 3, Cu far smaller than the thickness of the pulverized powder or the size of the principal surface was present. Thus, it has been recognized that in the metal powder core, Cu is dispersed among the pulverized powder of soft magnetic alloy ribbon. The Cu powder has changed from a spherical shape into a crushed shape (a flat shape). This may be interpreted as that the Cu powder has been deformed plastically between the principal surfaces of pulverized powder. The grain diameter of the Cu powder evaluated from the observation of the fracture surface was 5.0 μm. Here, when a cross section (a cross section viewed from a direction perpendicular to the pressurization direction of the metal powder core) where cross sections of the ribbons of the metal powder core in the thickness direction are predominantly exposed was polished and then SEM observation was performed so that the dimensions of flat pulverized powder in the longitudinal direction present within a view field of 0.2 $mm^2$ were averaged so that the grain diameter of the pulverized powder was evaluated, the result was 92 μm.

Embodiment Employing Nano Crystal Alloy

As a Fe-based nano crystal alloy ribbon, a Fe—Ni—Cu—Si—B family material having an average thickness of 18 μm was employed. The detailed composition was Fe bal.-Ni 1%-Si 4%-B 14%-Cu 1.4% in atom %. A quenched ribbon having this composition was pulverized without heat treatment for embrittlement. The conditions from the pulverization to pressing were similar to those of the embodiments and the comparison examples of the above-mentioned amorphous alloy ribbon. Then, in the examples of the present invention, a compact was fabricated with changing the content of Cu powder similarly to the embodiments of the above-mentioned amorphous alloy ribbon. Heat treatment serving also as strain release and crystallization treatment was performed on a pressed compact at approximately 420° C. for 0.5 hour in the air in an oven with a temperature-raising rate of 10° C./min so that a metal powder core was obtained.

Table 3 lists the results of evaluation of the characteristics such as the core loss performed similarly to the embodiments and the comparison examples of the above-mentioned amorphous alloy ribbon. Further, for a part of the metal powder cores, the hysteresis loss Phv over the total of the eddy current loss Pev and the hysteresis loss Phv was calculated similarly to the embodiments of the above-mentioned amorphous alloy ribbon. The results are listed in Table 4 together with the density of the metal powder core.

TABLE 3

| No | Pulverized powder content percentage (mass %) | Cu powder content percentage (mass %) | Core loss Pcv (kW/$m^3$) | Initial permeability μi | Remark |
|---|---|---|---|---|---|
| 14 | 100.0 | 0.0 | 182 | 47 | Comparison example |
| 15 | 99.9 | 0.1 | 175 | 48 | Example of present invention |
| 16 | 99.7 | 0.3 | 160 | 49 | |
| 17 | 99.5 | 0.5 | 158 | 49 | |
| 18 | 99.0 | 1.0 | 156 | 50 | |
| 19 | 98.0 | 2.0 | 163 | 47 | |
| 20 | 97.0 | 3.0 | 149 | 50 | |
| 21 | 95.0 | 5.0 | 134 | 48 | |
| 22 | 93.0 | 7.0 | 125 | 47 | |
| 23 | 91.0 | 9.0 | 121 | 46 | |
| 24 | 90.0 | 10.0 | 112 | 45 | |
| 25 | 97.0 | 3.0(*) | 188 | 53 | Comparison example |

(*)Fe-based amorphous alloy atomized powder was employed in place of Cu powder

TABLE 4

| No | Pulverized powder content percentage (mass %) | Cu powder content percentage (mass %) | Density × $10^3$ (kg/$m^3$) | Phv (kW/$m^3$) | Pev (kW/$m^3$) | Remark |
|---|---|---|---|---|---|---|
| 14 | 100.0 | 0.0 | 5.65 | 167 | 31 | Comparison example |
| 15 | 99.9 | 0.1 | 5.66 | 154 | 28 | Example of present invention |
| 17 | 99.5 | 0.5 | 5.66 | 140 | 29 | |
| 18 | 99.0 | 1.0 | 5.67 | 130 | 29 | |
| 19 | 98.0 | 2.0 | 5.67 | 139 | 28 | |
| 20 | 97.0 | 3.0 | 5.73 | 134 | 27 | |
| 22 | 93.0 | 7.0 | 5.85 | 106 | 27 | |
| 24 | 90.0 | 10.0 | 5.94 | 94 | 29 | |
| 25 | 97.0 | 3.0(*) | 5.70 | 163 | 30 | Comparison example |

(*)Fe-based amorphous alloy atomized powder was employed in place of Cu powder

Similarly to the case that the above-mentioned amorphous alloy ribbon was employed, in comparison with a fact that the core loss Pcv of the metal powder core of the comparison example No. 14 not containing Cu powder was 182 kW/$m^3$, the core loss Pcv of the metal powder core No. 15 of the present invention containing 0.1 mass % of Cu powder was reduced to 175 kW/$m^3$. It is understood that even when the nano crystal alloy ribbon intrinsically having a lower loss than the amorphous alloy ribbon is employed, the containing of Cu powder reduces the loss further by as much as approximately 4%. Further, the initial permeability pi has increased in comparison with the metal powder core No. 14 not containing Cu powder. From these facts, it is understood that in a case that the nano crystal alloy is employed, when Cu powder is contained even in an extremely very small amount, the core loss decreases in a state that the initial permeability is maintained. Further, in all of the metal powder cores Nos. 15 to 24 in Table 1 containing Cu powder, the core loss has decreased by 3% or more in comparison with the metal powder core No. 14 not containing Cu powder.

As clearly seen from Table 3, similarly to the case that the amorphous alloy ribbon was employed, it is understood that when Cu powder is increased, the core loss Pcv is allowed to be reduced. Further, it is understood that with increasing content of Cu powder, the density of the metal powder core is also improved so that compaction to $5.66\times10^3$ kg/m$^3$ or higher is achieved (Table 4). On the other hand, the initial permeability has increased as the content of Cu powder has increased. Then, after having passed the peak at 3.0 mass %, the initial permeability has decreased gradually. The initial permeability μi has hardly varied within the range of 0.1 mass % to 10.0 mass % (Nos. 15 to 24) listed in Table 3. That is, reduction of the initial permeability has been suppressed within 5% in comparison with a case that Cu powder is not contained (No. 14), so that the initial permeability has been maintained at 45 or higher.

As listed in Table 3, it is understood that the content of Cu powder is set to be 7 mass % or lower, an initial permeability higher than or equal to that of No. 14 not containing Cu powder is ensured. The reason why, despite that Cu is a non-magnetic material, reduction of the initial permeability is suppressed even when the content increases is expected to be attributed to the effect of the above-mentioned improvement in the density of the metal powder core caused by the containing of Cu, similarly to the case of the above-mentioned amorphous alloy ribbon. However, in the case of the nano crystal alloy ribbon, the presence of an effect further different from that of the amorphous alloy ribbon has become clear.

Further, it is understood that when the content of Cu powder is 0.3 mass % or higher (Nos. 16 to 24), reduction of the core loss by 10% or more is achievable in comparison with the metal powder core No. 14 not containing Cu powder. Further, it is understood that when the content of Cu powder is 3.0 mass % or higher (Nos. 20 to 24), reduction of the core loss by 15% or more is achievable. When the metal powder core having a core loss Pcv of 175 kW/m$^3$ or lower at a frequency of 20 kHz and at a magnetic flux density of 150 mT and having an initial permeability μi of 45 or higher at a frequency of 100 kHz listed in Table 3 is employed, this contributes to efficiency improvement and size reduction in a coil component or a device employing this. In this perspective, it is preferable to employ a metal powder core whose core loss described above is 165 kW/m$^3$ or lower.

As clearly seen from Table 4, the eddy current loss Pev has stayed within 27 to 30 kW/m$^3$ and has not largely varied regardless of the content of Cu powder. Thus, also in this case, it is understood that the effect of core loss reduction by the containing of Cu powder is mainly achieved by reduction in the hysteresis loss. When the hysteresis loss Phv is made lower than or equal to 160 kW/m$^3$, an overall core loss of 180 kW/m$^3$ or lower is achievable. It is understood that when the hysteresis loss Phv decreases, the ratio of the hysteresis loss Phv to the total of the eddy current loss Pev and the hysteresis loss Phv measured on the measurement conditions of a frequency of 20 kHz and an applied magnetic flux density of 150 mT is allowed to be reduced to 84.0% or lower or, further, 80.0% or lower.

On the other hand, the core loss Pcv of the metal powder core (No. 25) containing 3.0 mass % of a Fe-based amorphous alloy atomized spherical powder in place of Cu powder was 188 kW/m$^3$, which was larger than the core loss of No. 14 constructed from the pulverized powder of nano crystal alloy ribbon alone. Thus, the effect of core loss reduction which would be seen when Cu powder is contained was not seen.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A metal powder core which includes Fe-based soft magnetic material powder and Cu powder and in which the Fe-based soft magnetic material powder and the Cu powder are bound by a binder, wherein the Fe-based soft magnetic material powder is flat-plate shaped pulverized powder, the Cu powder is dispersed between principal surfaces of the pulverized powder, and the content of the Cu powder is 0.1% to 10% relative to a total mass of the pulverized powder and the Cu powder.

2. The metal powder core according to claim 1, wherein the pulverized powder is a Fe-based amorphous alloy, and the content of the Cu powder is 0.1% to 7% relative to a total mass of the pulverized powder and the Cu powder.

3. The metal powder core according to claim 1, wherein the pulverized powder has a nano crystalline structure.

4. The metal powder core according to claim 3, wherein the content of the Cu powder is 0.1% to 1.5% relative to a total mass of the pulverized powder and the Cu powder.

5. The metal powder core according to claim 1, wherein a hysteresis is loss lower than or equal to 160 kW/m$^3$ on measurement conditions of a frequency of 20 kHz and an applied magnetic flux density of 150 mT.

6. The metal powder core according to claim 1, wherein a silicon oxide film is provided on a surface of a particle of the pulverized powder.

7. The metal powder core according to claim 1, wherein the Cu powder is elemental Cu powder.

8. The metal powder core according to claim 1, wherein the thickness of the pulverized powder, the grain size of the Cu powder is at least 2 μm and no more than 50% of.

9. A coil component comprising:

a metal powder core according to claim 1; and a coil wound around the metal powder core.

* * * * *